Feb. 8, 1966     D. M. DAHLEN     3,233,389
AXIAL-FLOW CENTRIFUGAL VAPOR-LIQUID CONTACTING
AND SEPARATING DEVICE AND METHOD

Filed Oct. 29, 1962     2 Sheets-Sheet 1

Dean M. Dahlen     Inventor

By *Henry Berk*

Patent Attorney

Dean M. Dahlen    Inventor

By *Henry Berks*

Patent Attorney

3,233,389
AXIAL-FLOW CENTRIFUGAL VAPOR-LIQUID CONTACTING AND SEPARATING DEVICE AND METHOD

Dean M. Dahlen, Denville, N.J., assignor to Esso Research and Engineering Company, a corporation of Delaware
Filed Oct. 29, 1962, Ser. No. 233,740
3 Claims. (Cl. 55—89)

This invention relates to an axial-flow vapor-liquid contacting and separating device made for spiraling confined streams of vapor or gaseous fluid continuously in an upward direction, in the course of which, the spiraling vapors are contacted with liquid injected at spaced points to flow cocurrently for intervals and discharge the liquid thus carried at intervals.

The contacting and separating means of this invention are useful in distillation columns, for rectification and for stripping, in columns used for gas absorption and other processes in which high mass exchange and direct heat exchange are desired between vapors or gases and liquids.

Such apparatus is useful in the refining of organic compounds, in the production of petrochemicals, in the production and separation of various other chemical compounds, in gas absorption, extraction, humidifying, and cooling.

Up until the present, columns which have found most use for fractionation and contacing of vapors with liquids are of the bubble-plate type because of the simplicity of their design, construction, and maintenance. In the bubble-plate columns, gas or vapor travels up through the column having at spaced intervals horizontal plates which carry bubble caps. The vapor passes through vapor up-take ports or bubble cap risers distributed over the plates, then bubbles through a pool of reflux liquid held on each plate. In each bubble cap, the vapor stream entering from below the plate is forced to reverse its flow downwardly to enter the layer of liquid on a plate. On each plate the liquid overflows into a down-spout to flow down into the next lower plate.

In recent years it has been recognized that the bubble-plate type columns and other columns of that type utilizing gravity to separate liquid are not as efficient as desired for contacting with high flow rates of gas or vapor up through the column, and this has been an incentive for developing vapor-liquid contacting devices in which the vapor or gas is forced to spiral at an increased velocity into contact with films or sprays of liquid, thus utilizing a centrifugal force many times that of gravity to disengage liquids from vapors. Such contacting devices which have been designed and constructed fall into two main types:

(1) Devices shaped to induce mixing and centrifuging of vapor with liquid by fixed parts, and
(2) Devices having moving parts for creating centrifuging or agitation.

In general, these contacting devices have not been adapted for large scale operations, but rather for pilot plant or laboratory operations, mainly because they are too complicated, thus introducing fabrication problems in the construction of large columns.

In accordance with the present invention, an axial-flow centrifugal vapor-liquid contacting and separating device is provided which is approximately as simple for construction in large or high-pressure columns as the bubble-plate columns. The allowable higher gas velocity in the axial-flow centrifugal contacting and separating device herein described permits reduction of tower diameter, e.g. by as much as two-thirds compared to conventional bubble-plate towers. With the reduction of tower diameter, there is a saving in tower shell thickness for a given pressure.

The operation of the axial-flow centrifugal contacting device of the present invention is briefly as follows:

High velocity vapor entering at the bottom of the column flows axially in a channelled spiral up to the top through a number of stages, in each stage picking up liquid reflux flowing into the vapor conduit, then discharging the liquid from the conduit after the mixture of vayor and liquid passes through a centrifugal field in the conduit due to the presence in the conduit of a helical internal or centrifuging device. The helical internal produces a centrifugal field in the vapor-liquid mixture which throws the liquid to the wall of the vapor conduit. The liquid travels up the wall cocurrently with the vapor and then is expelled through a circumferential liquid outlet slot or opening while the vapor continues on into the next upper stage to repeat this performance of receiving injected liquid, contacting the liquid, and centrifuging to expel the contacted liquid. The liquid thrown out from the axially spiraling vapor just above the helical internal flows onto a plate termed an over-flow plate, then down through a down-spout or down-comer onto a collection plate of a next lower stage where the liquid then is injected peripherally or from orifices in the side of the vapor conduits into the axially spiraling streams of vapor.

An interesting and unexpected feature of the operation of the axial-flow centrifugal contacting and separating device is the manner in which the liquid is injected into each spiraling vapor stream below the centrifuging internal and then expelled from the spiraling vapor stream without any reversed (downward) flow of the vapor, and thus without impeding the continuous spiral upflow of the vapor through a number of stages.

A number of the vertical vapor conduits can be arranged in parallel in each stage to receive liquid from a common down-comer at a uniform rate and discharge liquid to a common over-flow plate, thus eliminating expensive construction.

Another interesting feature of the axial-flow centrifuging with unexpected effectiveness is the self-regulating flow of liquid which is separated from the spiraling vapor stream at the top of each stage, then flows down onto a liquid collection plate in the stage below to build up thereon a liquid pool of proper level for feeding liquid back into the spiraling vapor streams at this lower stage at a suitable rate, i.e. under a suitable pressure head, especially considering the simplicity of construction. In this respect, the axial-flow centrifugal contacting device functions automatically with respect to the countercurrent flow of liquid reflux.

The axial vapor-flow contacting device and its operation will be described in more detail with reference to the drawing.

In the drawing, FIGURE 1 illustrates, partly in cross-section and schematically, an elevational view of a multi-stage contacting column containing the axial-flow conduits for the spiraling vapor stream, these conduits being in parallel.

Figure 1:
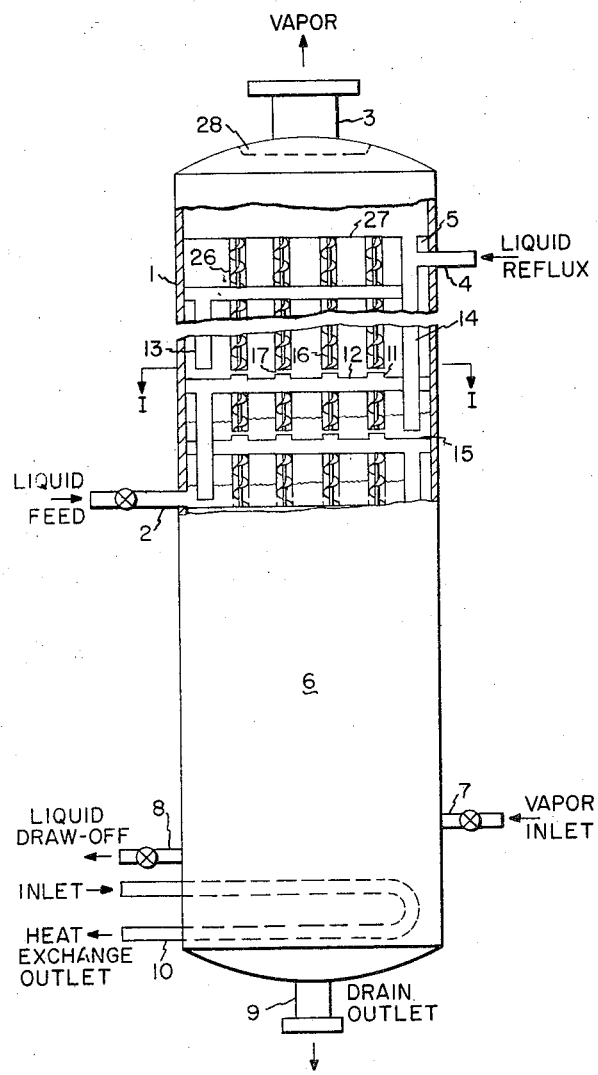

The cylindrical vessel or column 1 shown in FIG. 1 is made of steel or other suitable material commonly employed for making up apparatus for various gas or vapor and liquid contacting operations. In using such apparatus for a centrifugal fractionation, as in a fractional distillation of mixed liquid components having different volatilities, a preheated liquid feed can be made to enter the column through the feed line 2 at an intermediate stage. Vapors that are fractionated by having passed through the upper rectification section are withdrawn from the top of the column through the vapor outlet 3 to be passed to a conventional cooling and vapor condensing apparatus. Liquid reflux obtained from condensation of the vapor effluent from the top of column 1 may be returned through the inlet 4 to the column to a reflux down-spout line 5. In the column below the feed inlet line 2 is a stripping section 6 made up of axial-flow contacting tubes arranged in stages in the same manner as in the upper rectifying section. Vapor or gas from an external source can be fed into the bottom part of column 1 through a line 7. Liquid residue may be drawn off from the bottom of column 1 through line 8 or through a drain 9. The column may also be equipped with a reboiling heat exchange tube 10.

If the column 1 is to be used as a stripping, absorption or cooling column, the liquid feed may be made to enter the upper part of the column through line 4 rather than at the intermediate feed point of line 2.

Sidestreams may also be withdrawn from the column used for fractionation by having sidestream lines to withdraw either liquid from a plate or vapor. For example, line 2 could be used as a sidestream withdrawal line rather than as a feed line.

In general, the underlying principles for contacting gases or vapors with liquids to accomplish a separation by distillation or to accomplish absorption, desorption or abstraction, are similar in requiring a general counterflow of gases and vapors with respect to the liquids, good mixing contact of the liquids with the gases or vapors, and good separation at various stages without undue entrainment. It is also highly desirable to obtain contact of all the liquid with vapor or gas as can be accomplished with the present invention.

Figure 2:
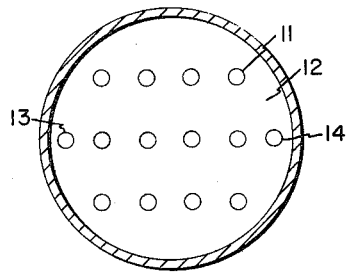
FIGURE 2 shows a cross-sectional plane view at I—I in the elevational FIGURE 1.

The horizontal cross-sectional view shown in FIG. 2 shows a simple arangement of 12 axial-flow vapor tubes include a section 11 rising from a liquid collection tray 12, said tray receiving reflux from the down-spout 13, while the down-spout 14 supplies reflux to the next lower tray 15.

Figure 3:
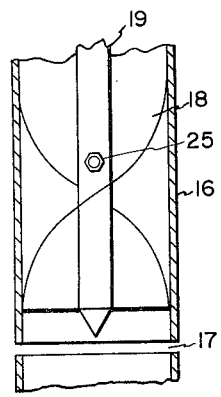
FIGURE 3 is an enlarged cross-sectional view of a contacting tube in which the vapors are spiraled by a helicoid twisted ribbon on a central core, this so called internal or ribbon device fitting into the spiraling vapor contacting tube or axial-flow conduits.

The vapor axial-flow tubes includes a section 11 carried on the tray 12 which may be in the form of risers and they may comprise a section of the parallel contacting tubes 16 with a slot opening or jet orifice 17 to return liquid from plate 27 to the upwardly spiraling vapors. Such an inlet slot 17 is depicted in FIG. 3 which shows an enlarged view of a fixed helical internal 18. This internal may be described as a twisted ribbon. It is easily made by the twisting of metal sheets into the helical form as shown, and preferably the twisted ribbons are welded to a central core 19, which helps to eliminate entrainment on a central vortex where centrifugal forces are lower. Each of the contacting tubes in each of the stages may thus be provided with such fixed helicoid or helical vanes. The pitch of the vanes may be uniform or variable, e.g. logarithmic (increasing axially upwards).

Other types of centrifuging devices may be replaced in the contacting tubes 16 to maintain the spiraling of the vapor passing up through the contacting tubes with the injected liquid reflux, as for example, an air-foil vane. The air-foil vane is a rather difficult article to form and does not function any more efficiently than the simpler twisted ribbon vane. There are still other forms of centrifuging vanes which are also more complicated than the twisted ribbon vane. Somewhat as in the air-foil vane, the radially spaced foil vanes may be replaced by flat vanes. Also, there are other forms of helical baffles which effect spiraling vapors, but these offer various degrees of resistance to the flow of vapors and liquids up through the contacting tubes compared to the single helical ribbon or twisted ribbons on a central core.

Figure 4:
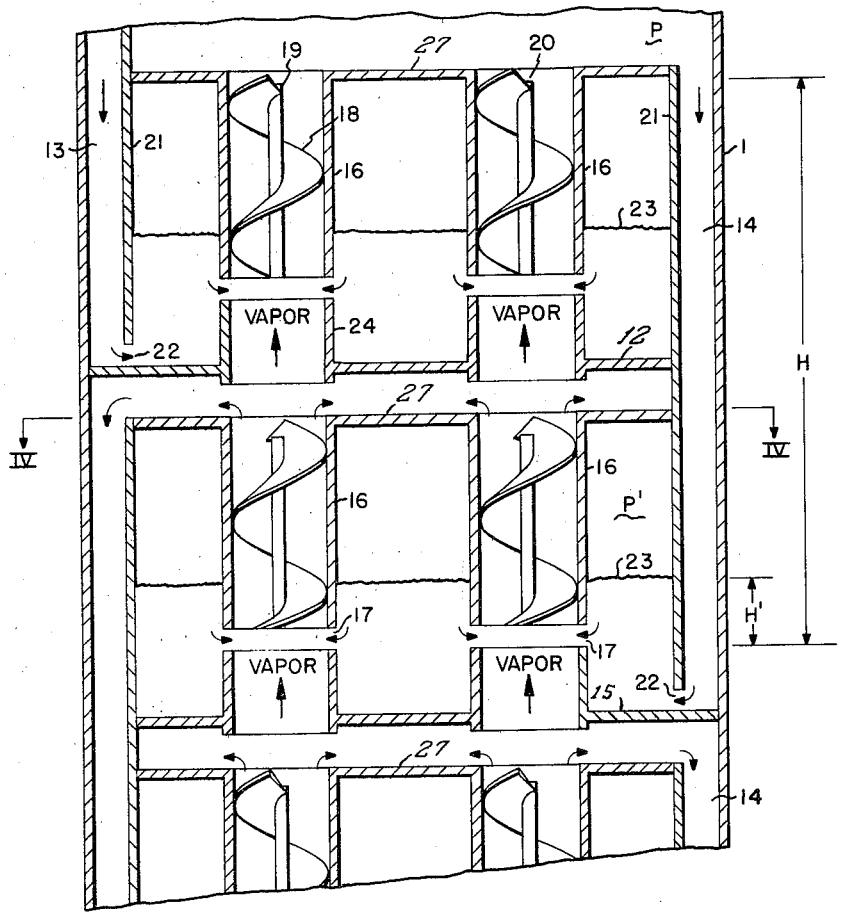
FIGURE 4 is an enlarged cross-sectional elevational view showing two stages with two axial-flow vapor streams for simplicity in the explanation of the principle of operation.
Figure 5:
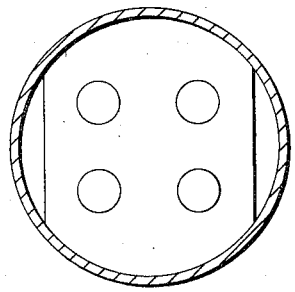
FIGURE 5 is a horizontal cross-sectional view at plane IV—IV in FIG. 4.

By referring to FIG. 4, a more detailed explanation can be made with respect to construction and operation. In FIG. 4, two full stages of vapor-liquid contacting and separation are shown. In the upper stage, the contacting tubes 16 contain the internal fixed twisted ribbons 18 on a central core 19. The contacting tubes 16 extend vertically downward from their openings 20 communicating with over-flow plate 27 onto which liquid is expelled radially from the spiraling vapor stream. This liquid flows to a down-comer 14. This down-spout or down-comer 14 is in the form known as a chord in which a vertical wall 21 forms one side of the spout holding the downwardly flowing liquid in spout 14 and the inner shell wall 1 encloses the other sides of the spout. The liquid filling the down-spout 14 discharges through a gap 22 at the bottom end of the wall 21 onto the tray 15 of the next lower stage to build up a liquid pool having an upper liquid level 23 which is above the slot or orifice 17 through which the collected liquid is injected into spiraling vapor passing up through the contacting tube 16 of this lower stage. Each contacting tube up through which the vapor spirals in a lower stage is in alignment with a similar contacting tube 16 in an upper stage, as shown, so that the vapor continuously spirals through each stage and from stage to stage. Each stage has a bottom liquid collecting tray which receives reflux or liquid from an upper stage through a down-spout such as 14 and 13, and the liquid received on the bottom trays builds up to a level 23 which is above the level of the slots or orifice inlets 17, for the liquid to be injected into the spiraling vapor. Each stage has an upper plate 27 onto which flows the liquid centrifuged out of the spiraling vapor at the upper part of a centrifuging contacting tube 16.

As shown in FIG. 4, the spiraling vapor is guided and passed up through a riser tube 24 to be guided into an upper stage contacting tube 16 in axial alignment. The riser may be similar in form to the riser or vapor up-take on a bubble-plate to form a circular passageway for vapors through a tray. It is preferably made to have the same internal diameter as the contacting tubes 16 so that the spiraling vapors passing up through the risers are not hindered or deflected in passing on up through the contacting tube 16 in the next above stage. The risers 24 may be in the form of short nipples screwed into holes in the bottom trays, or they may be welded thereto. The lower ends of the risers may be made to extend a short distance below the bottom trays. The risers 24 may be made to extend up to a distance short of the bottom of the contact tubes 16 to leave the circumferential space 17 for ingress of liquid into the upwardly spiraling vapor, or may be a downward extension of tubes 16 from liquid jet inlets therein. These inlets between the bottom ends of the contacting sections and the tops of the riser sections serve the same function as a slot opening 17 as shown in FIG. 3.

Modifications may be made in the shapes of the tube walls, e.g. to the bottom of the contacting tubes 16 and the tops of the risers 24. For example, the walls may be given a tapered or beveled edge for making a modification in the influx of the liquid into the upwardly spiraling vapor stream. The twisted ribbon internals 18 may be fixed inside the contacting tubes 16 by welding or by use of a removable bolt 25, as shown in FIG. 3. Still other modifications may be used for fixing the internal spiraling means in such a way as to avoid obstruction of the upward flow of the vapors.

In using a column containing the aligned axial-flow contacting tubes, the top stage containing said tubes can be arranged to omit influx of liquid, as shown in FIG. 1, with respect to the top tubes 26. The purpose of omitting the influx of liquid in this top stage is to have the top tubes 26 function to remove entrained liquid particles which are centrifuged out to separate at the top of the tubes 26, then flow onto the top plate 27. The entrained liquid thus separated out onto the top plate 27 flows down onto the reflux pipe 5, or down-spout, to the tray of the next lower contacting stage. The apparatus may also have near its top vapor exit 3, an additional demisting device through which the vapors have to pass, for example, wire mesh screens 28, so arranged as not to create too much resistance to the flow of the vapors leaving the top internal of the vessel 1 through the vapor outlet 3.

The simplicity of construction and arrangement of parts in the axial-flow vapor-liquid contacting device herein described has served as a useful model in making many tests on the capacity and efficiency of the system described to determine how it compared with other kinds of vapor contacting devices.

Two kinds of apparatus were tested on a pilot plant scale. In one apparatus, a single 4" diameter axial-flow line of contact tubes was used. In a larger apparatus used for test purposes, four lines of vertical axial-flow contact tubes were used in parallel with three stages and with a top stage used for removing entrainment. The test results from the pilot plant apparatus gave the following data:

Capacity

At an equivalent stage height, one 4" diameter axial-flow contacting tube has the same capacity as three to four bubble caps. This capacity advantage can be made even greater by the closer allowable spacing of the axial-flow centrifugal contacting tubes since contacting takes place primarily in the tubes rather than on the plate.

Contacting efficiency

The number of theoretical equilibrium stages obtained per stage having a 4" diameter axial-flow contacting tube is in the range of about 0.6 to 1.0 as determined by heat and mass transfer between vapor and liquid. Determinations were made with a helix having a 12" pitch (the distance between two nodes of the twisted ribbon), with the contactor vapor velocity in the range of about 30 to about 120 feet per second (maximum superficial velocity of about 20 to about 30 feet per second). It is to be noted that maximum limits on vapor velocity in conventional towers is usually about 10 feet per second. With the centrifugal axial-flow of the spiraling vapors, the heat transfer is increased as the velocity is increased. The reverse is true in using an open pipe without the centrifuging of the helical ribbons.

Collection efficiency

Studies were made on the percent of liquid collected with reference to the superficial velocity of the vapor passed up through the contacting tubes. The percent liquid drawn out from the spiraling vapors leaving the upper end of the contacting tubes containing the helical internal showed that above 90% of the liquid could be separated out from the spiraling vapors. The effect of entrainment on fractionation efficiency depends upon a number of factors. However, by having less than 10% entrainment, a high fractionation efficiency is obtained.

Pressure drop

Pressure drop in inches of liquid for each stage was determined with reference to superficial vapor velocity. The pressure drop per stage of the axial-flow centrifugal contacting device appeared significantly greater than that for conventional bubble-plate fractionators. Stage heights may be made greater and the vapors may have to be under high pressures when using the axial-flow contacting device. Designs have been made based on 18" hot liquid theoretical pressure drop per stage to permit tray spacings comparable to plate spacings in conventional towers without excessive down-comer filling. This pressure is about three times that for conventional towers without excessive down-comer filling. In general, this means that the preferred operating pressure for the centrifugal fractionations is above about 40 p.s.i.a. A suitable pressure drop for one stage was found to be in the range of 18–20" of liquid water for a stage height of 24" in which a 4" inside diameter contacting was occupied by a 12" long twisted ribbon centrifuging internal. With a liquid flow rate of 5.9 gallons per minute, the maximum allowable spiraling gas velocity was in the range of 30–120 feet per second for a pressure drop of 18" liquid per stage.

The described quantitative relationships are of interest in that they were used in demonstrating that the column having a number of parallel spiral vapor streams passing upwardly from one stage to another at high velocity, centrifuging out the liquid at the top of each stage, and being preferably injected with liquid reflux from an upper stage, can function with self-adjustment efficiently.

One significant feature of self-adjustment of the system is that the over-flow plates do not become flooded and thus cause a blocking of the spiral vapor in its upward course to the higher stages.

Another significant requirement is that the hydraulic pressure in the down-comers or down-spouts from an upper stage to a lower stage has to be properly balanced between hydraulic pressure surrounding the contacting tube to a level above the circumferential inlet or the orifices through which the liquid is introduced into the spiraling gas or vapor as it passes by the circumferential inlet which is surrounded by the liquid being injected. Although all the factors involved on the flow of the liquid into the gas or vapor stream at the significant slots 17 give a complicated theoretical problem of measurement, the main factors can be pointed out with reference to FIG. 4.

It will be noted that in FIG. 4, the approximate hydraulic pressure head H corresponds to the height of the column of liquid from its top level in the down-spout 14 to a level which is at about the center line of the circumferential inlet 17 in the next lower stage to which the reflux is passed. This fluid head H, together with the static gas pressure P above it, has to counterbalance the liquid head H' from the upper level 23 of the liquid surrounding the lower parts of the contacting tubes 16, and essentially above the inlet 17 together with the static gas pressure P' which is developed above the liquid level 23 in a gas plenum, with allowances for other head losses due to the velocities of the liquid and develop the right amount of pressure to force the liquid to enter the circumferential inlet slot 17. Experimental tests have demonstrated that this counterbalancing pressure relationship is achieved satisfactorily for forcing liquid to flow at a steady desired velocity through the circumferential slots or jet orifices into the spiral vapor stream in each stage and with a multiplicity of axial vapor flow contacting units in each stage. This kind of self-regulation has not heretofore been achieved with any known centrifuging vapor-liquid contacting device.

In other known types of centrifuging vapor-liquid devices, there are various hindrances toward obtaining self-adjustment with regard to the flow of reflux from an upper stage to a lower stage to return the reflux to a spiraling vapor stream, and there are obstructions to the spiraling vapor stream in the attempts to feed back liquid reflux. On account of these deficiencies, the earlier centrifugal contacting systems, in general, have been forced to be limited to a single spiraling gas or vapor stream in one tower or column, and they have been forced to employ complicated refluxing devices which are not in self-adjustment balance. Such refluxing devices not in self-adjustment balance essentially require intricate means for controlling the flow rates of the liquid reflux and of the vapor or gas, such as valved external piping, pumps, and expensive tower construction difficult to service.

A pilot plant scale centrifugal fractionating tower tested had an effective 2 ft. diameter with four 4 in. diameter contactors in parallel aligned in each of the contact stage sections to send four spiraling vapor streams up through the series of contacting tubes. In each of the contacting tubes, a variety of internal elements for inducing the spiral flow of the gas or vapor was used, e.g. the helical twisted ribbon and airfoil vanes. The spiral-inducing vanes used had a diameter equal to the internal diameter of the contacting tubes 16 and could be inserted, fixed for functioning therein, and removed from the contacting tubes. The tower was put together as flanged sections mounted one above another to permit easy access for servicing.

Each contact stage section can be said to be defined as being an upper over-flow plate 27, the contacting tubes 16 containing the helical device 18 extending down from the over-flow plate, the down-spout or down-comer receiving the liquid from the top surface of the over-flow plate 27, a bottom or lower tray which collects reflux from an upper similar contact stage and which has the riser passages 24 for vapors from a lower contact stage that spiral up through the aligned contacting tubes 16, and between the vapor risers 24 and the lower end of the contacting tubes 16 are the peripheral slots or jet orifices 17 for injecting the liquid which is backed up to a higher level surrounding the contacting tubes 16. The liquid level 23 above slot 17 overcomes the liquid pressure loss through slot 17. The contact stage section, as described, has a height of 24 inches measured from one bottom plate to the next. The helical internal is 12 inches long in a contacting tube 17.5 inches long. The orifice is 0.5 inch wide. The riser extends 1.5 to 2 inches below the bottom tray and leaves a 1.5 inch space to the top of the next lower contact tube. These proportions can be varied depending on operating conditions and physical properties of the fluids.

Modifications may be made in the shapes of the parts described. The down-spouts may be in the form of vertical pipes or of the chord type, as illustrated, and the down-spout inner wall 16 may be slanted toward the inner circumferential wall of the tower so as to give a larger upper opening for the run-off of the liquid from the top surface of the over-flow plates 27, and to reduce effects of foaming.

For the effective 2.5 ft. diameter tower, including plate and down-comer area, the risers or spiraling vapor uptake passageways 24 were 2.5 inches in height from the top surface of the trays to the peripheral slots or liquid injection orifices 17. These risers are tubes of the same internal diameter as the contacting tubes 16 to contain the upwardly spiraling vapor or gaseous streams. These riser tubes may be an integral part of the tray or may be threaded at the base like a nipple to be screwed into a threaded circular opening in the tray. The top rim of the riser tubes 24 may be beveled to a thin edge, or be otherwise modified for making variations in the flow of liquid into the spiraling vapor stream in each of the contact stage sections so that the liquid becomes dispersed in the spiraling vapor streams as it approaches the lower opening of the contacting tubes 16 below the helical element 18.

For the pilot tower with an effective diameter of 2.5 ft. and with four 4 inch diameter contacting tubes in each stage, a liquid flow rate from stage to stage was maintained at 6000 gallons per hour. The gas velocity was varied through the contacting tube from as low as 30 ft. per second up to about 120 ft. per second. With satisfactory operation on tests using a single series of contacting tubes in stages, high contacting efficiency was obtained as measured by mass heat transfer, and good separation of liquid from the spiraling vapor streams, above 90%, was obtained in each of the stages. On account of the efficiency obtained with this staged centrifuging contact of liquid with the high velocity spiraling vapor streams falling in parallel up through the stages, it has been determined that the tower can be nearly half the size of a conventional tower for use in fractionation, as for example, in using the tower as a depropanizer for removing propane from a liquid mixture contacting butane.

What is claimed is:

1. Method for contacting in stages a liquid with upwardly flowing streams of gaseous fluids in conduits each gaseous fluid in each conduit having a circular cross-section while passing through the stages in series and separating the contacted liquid in each stage for countercurrent flow to a lower stage, which comprises passing said streams of gaseous fluid in parallel and continuously upwardly through a series of the stages, collecting a pool of liquid separated from the gaseous fluid streams in a stage above in the lower part of each stage, injecting liquid from the pool in each upflowing stage through a peripheral orifice in each conduit into each stream of gaseous fluid and perpendicularly thereto for movement therewith in an upward direction, contacting thus injected liquid in cocurrent flow with the gaseous fluid, inducing upward spiraling to the streams of gasous fluid and injected liquid and thereby centrifuging the thus injected and contacted liquid out to the periphery of each gaseous fluid stream passing unidirectionally upward toward an upper part of a stage, separating liquid centrifuged out peripherally from the upwardly spiraling gaseous fluid at the upper part of each stage passing the gaseous fluid streams up through a stage above, and passing thus separated liquid to a pool collected in a lower stage for subsequent injection into, and cocurrent travel with, the upflowing stream of gaseous fluid in said lower stage.

2. In apparatus of the character described for contacting a continuously upflowing stream of vapor with liquid and separating the liquid therefrom, the combination which comprises:

(a) an enclosed tower and means for causing upward flow of vapors therein, (b) a series of stages of spaced pairs of horizontal trays and plates each stage having a plate above a tray to collect and hold a head of liquid therebetween, each spaced pair arranged to collect and pass to a lower stage a liquid centrifuged from upflowing vapor, said trays and plates extending across said tower, (c) a plurality of conduits for upflowing fluid extending between the plate and tray of each stage, each of said conduits including a riser tube section extending upwardly from a said tray and a contactor tube section extending downwardly from a said plate into close proximity with the upper portion of said riser tube section, said riser tube section and contactor tube section being vertically axially aligned and arranged for continuous upward unidirectional flow of fluid, said contactor tube section including means for imparting rotational and liquid-separating centrifuging force to fluid passing therethrough, means for maintaining said head of liquid above the top of the riser tube section, (d) an outlet at the upper end of each of said conduits communicating above a said plate for centrifuged liquid, and (e) an inlet in each of said plurality of conduits between the riser tube section and the contactor tube section above a said tray for injecting the liquid stored between the plate and tray of each stage under the pressure head into the vapors passing upwardly through each of said conduits for upward travel therewith and passage through said contactor tube section.

3. Combination according to claim 2 wherein each riser tube section has a portion which depends below its associated tray.

(References on following page)

References Cited by the Examiner

UNITED STATES PATENTS

| | | |
|---|---|---|
| 989,655 | 4/1911 | Sicka _____ 55—345 |
| 1,867,933 | 7/1932 | Wilton. |
| 1,983,762 | 12/1934 | Kotzebue. |
| 2,075,344 | 3/1937 | Hawley. |
| 2,738,964 | 3/1956 | Binder et al. _____ 202—158 X |
| 2,808,897 | 10/1957 | Reinsch et al. |
| 2,847,200 | 8/1958 | Ung _____ 261—114 X |
| 3,070,360 | 12/1962 | Rafferty et al. _____ 202—158 X |

FOREIGN PATENTS 809,309    7/1951    Germany.

REUBEN FRIEDMAN, *Primary Examiner*.